(12) United States Patent
Kato et al.

(10) Patent No.: US 10,300,958 B2
(45) Date of Patent: May 28, 2019

(54) VEHICLE BODY STRUCTURE

(71) Applicant: HONDA MOTOR CO., LTD., Tokyo (JP)

(72) Inventors: Yasuyuki Kato, Wako (JP); Hiroki Tanigawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 275 days.

(21) Appl. No.: 15/295,586

(22) Filed: Oct. 17, 2016

(65) Prior Publication Data

US 2017/0113734 A1 Apr. 27, 2017

(30) Foreign Application Priority Data

Oct. 22, 2015 (JP) .................................. 2015-207754

(51) Int. Cl.
| | | |
|---|---|---|
| *B62D 25/08* | (2006.01) | |
| *B60R 19/18* | (2006.01) | |
| *B62D 21/15* | (2006.01) | |
| *B62D 25/20* | (2006.01) | |
| *B60R 19/24* | (2006.01) | |

(52) U.S. Cl.
CPC .............. *B62D 25/08* (2013.01); *B60R 19/18* (2013.01); *B60R 2019/1806* (2013.01); *B60R 2019/247* (2013.01); *B62D 21/152* (2013.01); *B62D 25/2027* (2013.01)

(58) Field of Classification Search
CPC .... B62D 25/08; B62D 25/087; B62D 21/152; B62D 25/2027

USPC ........................... 296/187.11, 193.08, 203.04
See application file for complete search history.

(56) References Cited

U.S. PATENT DOCUMENTS

| | | | | |
|---|---|---|---|---|
| 7,469,959 | B2 * | 12/2008 | Egawa ................... | B62D 25/08 293/154 |
| 8,888,157 | B2 * | 11/2014 | Narahara ........... | B62D 25/2027 296/1.08 |
| 9,254,874 | B2 * | 2/2016 | De Luca ............ | B62D 25/2027 |
| 2006/0103170 | A1 | 5/2006 | Ikemoto et al. | |
| 2007/0114815 | A1 * | 5/2007 | Egawa ................... | B62D 25/08 296/203.04 |
| 2017/0210428 | A1 * | 7/2017 | Hallik ..................... | B60R 19/34 |

FOREIGN PATENT DOCUMENTS

| | | | | |
|---|---|---|---|---|
| CN | 202400042 U | | 8/2012 | |
| DE | 951494 C | * | 10/1956 | ............. B62D 21/10 |
| DE | 3822585 A1 | * | 1/1989 | ........... B62D 21/152 |

(Continued)

*Primary Examiner* — Hilary L Gutman
(74) *Attorney, Agent, or Firm* — Westerman, Hattori, Daniels & Adrian, LLP

(57) ABSTRACT

An automotive vehicle body structure includes a rear panel arranged in a vehicle width direction in a vehicle body rear portion, a rear cross member connected to a rear surface of the rear panel, extending along the vehicle width direction, and defining a closed cross section between the rear cross member and the rear panel, and a rear bumper beam connected to a rear section of the rear cross member and extending along the vehicle width direction. The rear cross member includes an extending portion extending along the rear panel outward in the vehicle width direction from an outer end of the rear bumper beam in the vehicle width direction.

10 Claims, 4 Drawing Sheets

(56) References Cited

FOREIGN PATENT DOCUMENTS

| WO | WO-0246026 A1 * | 6/2002 | ............. B60R 19/18 |
| WO | WO-2005056370 A1 * | 6/2005 | ............. B62D 23/00 |
| WO | 2011-027638 A1 | 3/2011 | |

* cited by examiner

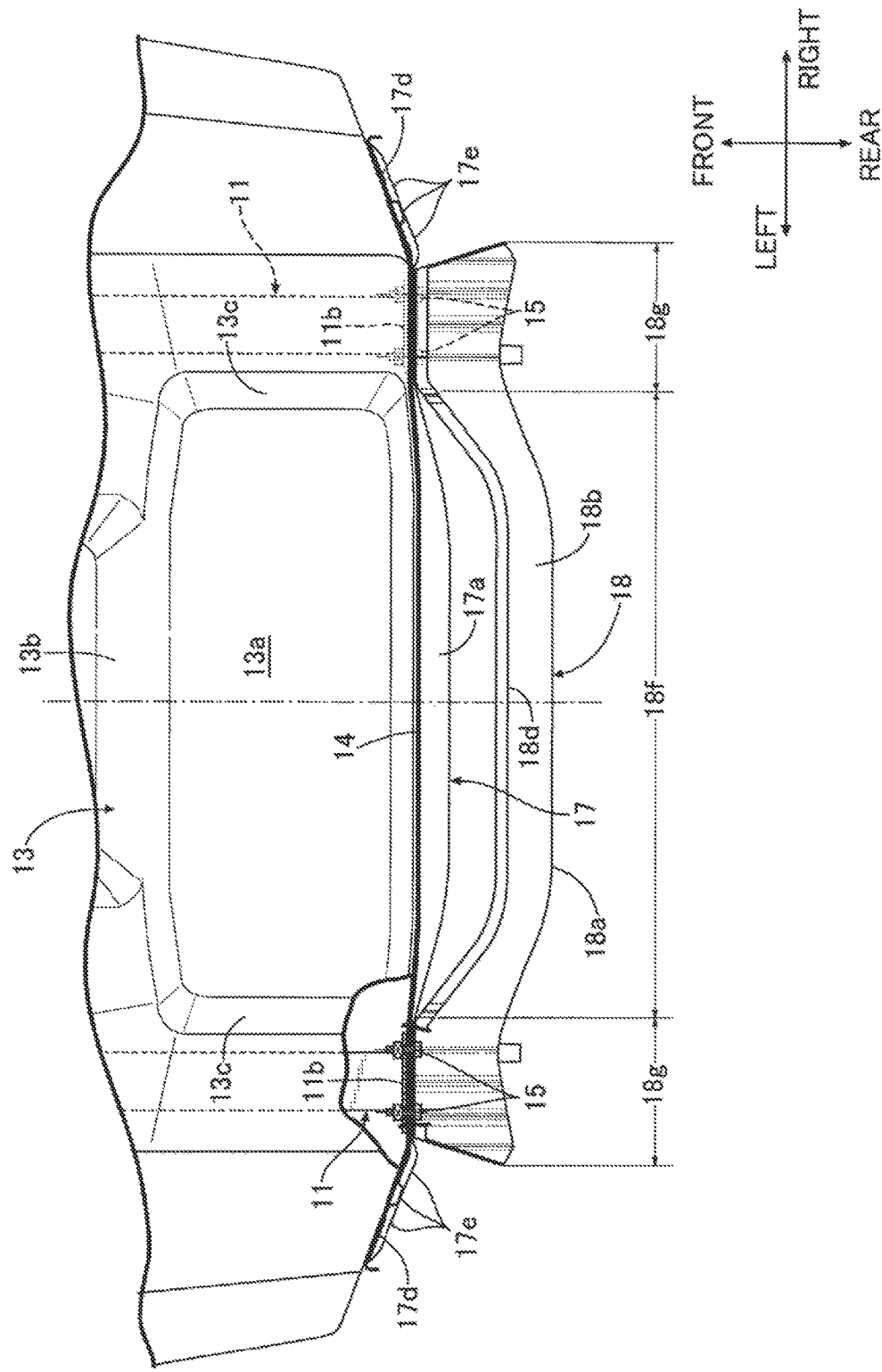

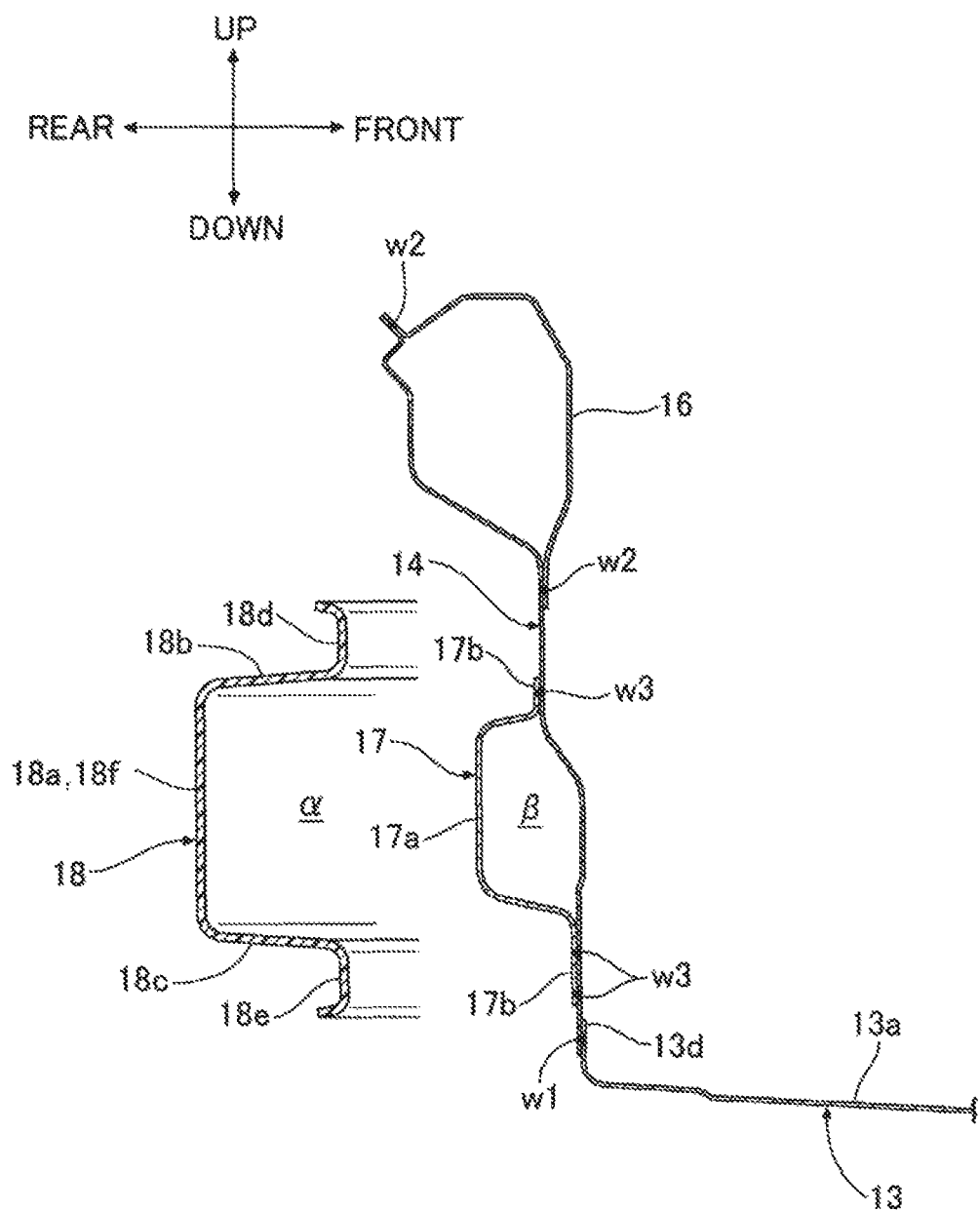

VEHICLE BODY STRUCTURE

CROSS REFERENCES TO RELATED APPLICATIONS

The present application claims priority under 35 U.S.C. § 119 to Japanese Patent Application No. 2015-207754, filed Oct. 22, 2015, entitled "Vehicle Body Structure." The contents of this application are incorporated herein by reference in their entirety.

TECHNICAL FIELD

The present disclosure relates to an automotive vehicle body structure including a rear panel arranged along a vehicle width direction in a vehicle body rear portion, a rear cross member connected to a rear surface of the rear panel, extending along the vehicle width direction, and defining a closed cross section between the rear cross member and the rear panel, and a rear bumper beam connected to a rear section of the rear cross member and extending along the vehicle width direction.

BACKGROUND

An automotive vehicle body structure known from International Publication No. WO 2011-027638 includes a rear panel defining a rear wall of a trunk in a vehicle body rear portion, a rear bumper beam arranged along a vehicle width direction behind the rear panel, and an upper member and lower member. The upper and lower members extend along the vehicle width direction, are placed vertically, and are fixed between the rear panel and rear bumper beam.

That known structure has a problem in that the effect of enhancing the rigidity of the vehicle body rear portion brought by the arrangement of the upper member and lower member is not sufficiently achieved because the end portions of the three members of the rear bumper beam, upper member, and lower member in the vehicle width direction terminate at the same location.

SUMMARY

The present application describes, for example, sufficiently achieving the effect of enhancing the rigidity of a vehicle body rear portion brought by a rear cross member disposed between a rear panel and a rear bumper beam.

According to a first aspect of the embodiment, an automotive vehicle body structure includes a rear panel, a rear cross member, and a rear bumper beam. The rear panel is arranged in a vehicle width direction in a vehicle body rear portion. The rear cross member is connected to a rear surface of the rear panel, extends along the vehicle width direction, and defines a closed cross section between the rear cross member and the rear panel. The rear bumper beam is connected to a rear section of the rear cross member and extends along the vehicle width direction. The rear cross member includes an extending portion extending along the rear panel outward in the vehicle width direction from an outer end of the rear bumper beam in the vehicle width direction.

With the configuration in the first aspect, the strength can be increased by the increased thickness of the three-layered portion in which the rear cross member is disposed between the rear panel and rear bumper beam, and the torsional rigidity of the vehicle body rear portion can also be enhanced by the extending portion, which extends outward in the vehicle width direction from the rear cross member.

In the configuration according to the first aspect, the rear panel may have an indentation on an outer end thereof in the vehicle width direction, the extending portion may be positioned behind the indentation, and the rear cross member may include a reinforcing bead disposed on the extending portion.

With that configuration, the weight of the rear panel can be reduced by the weight of the indentation, and the torsional rigidity of the vehicle body can be ensured by the reinforcing bead in the extending portion.

In the configuration according to the first aspect, the rear bumper beam may include a first rear protrusion disposed in a central portion thereof in the vehicle width direction, protruding rearward, and defining space between the rear bumper beam and the rear cross member, and the rear cross member may include a second rear protrusion disposed in a central portion thereof in the vehicle width direction and protruding rearward toward the first rear protrusion.

With that configuration, the torsional rigidity of the rear bumper beam itself can be increased by the first rear protrusion, the torsional rigidity of the rear cross member itself can be increased by the second rear protrusion. In addition, the space between the rear bumper beam and rear cross member and the space between the rear cross member and rear panel can be expanded by the first rear protrusion and second rear protrusion, and the deformation stroke at the time of collision on the rear surface can be ensured.

BRIEF DESCRIPTION OF THE DRAWINGS

The advantages of the disclosure will become apparent in the following description taken in conjunction with the following drawings.

FIG. 3 is a view taken along line III-III in FIG. 2.

FIG. 4 is a cross-sectional view taken along line IV-IV in FIG. 2.

DETAILED DESCRIPTION

An embodiment of the present disclosure is described below with reference to FIGS. 1 to 4. A longitudinal direction and transverse direction (vehicle width direction) in the description are defined with respect to an occupant sitting in the driver's seat.

Figure 1A:
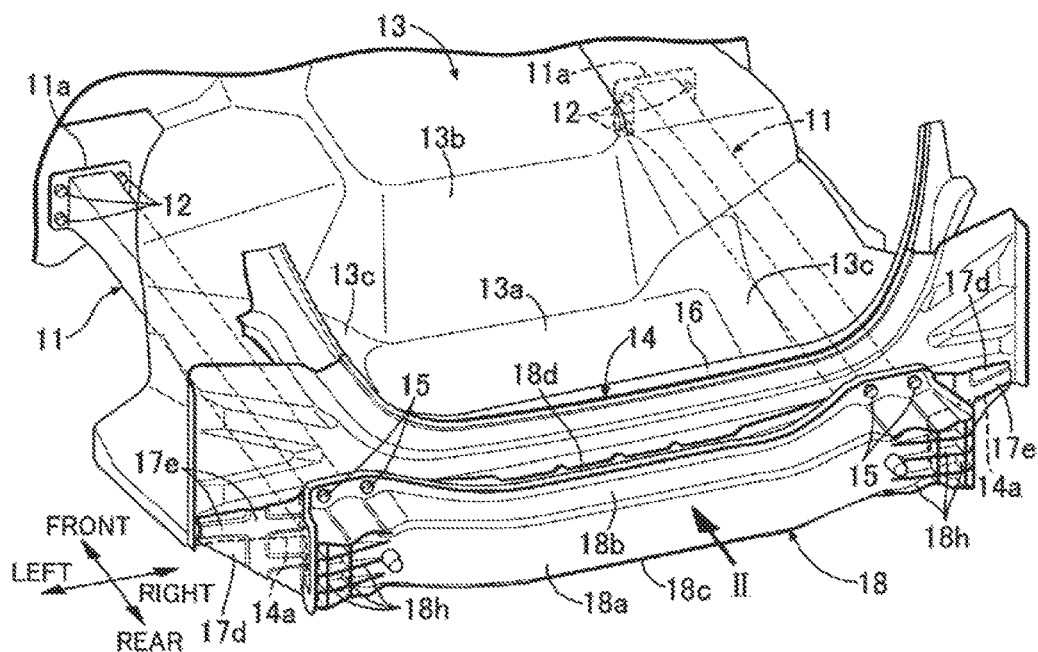
FIGS. 1A and 1B are perspective views of an automotive vehicle body rear portion of an embodiment.
Figure 1B:
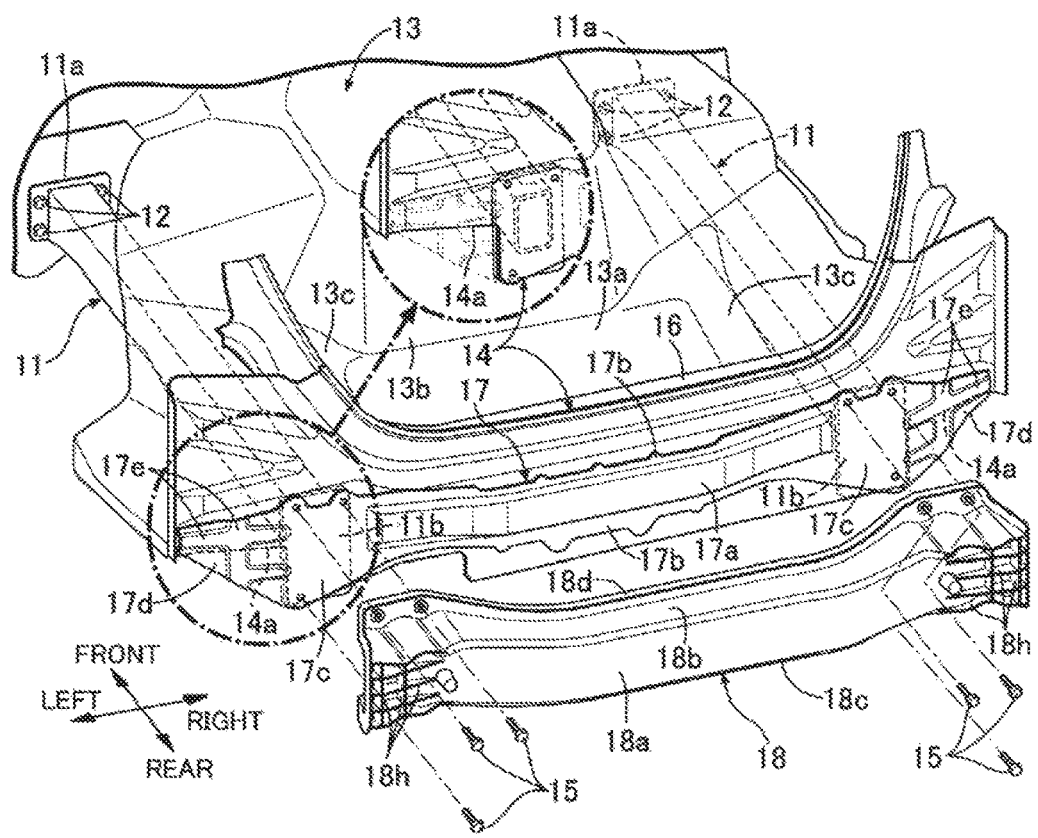
Figure 2:
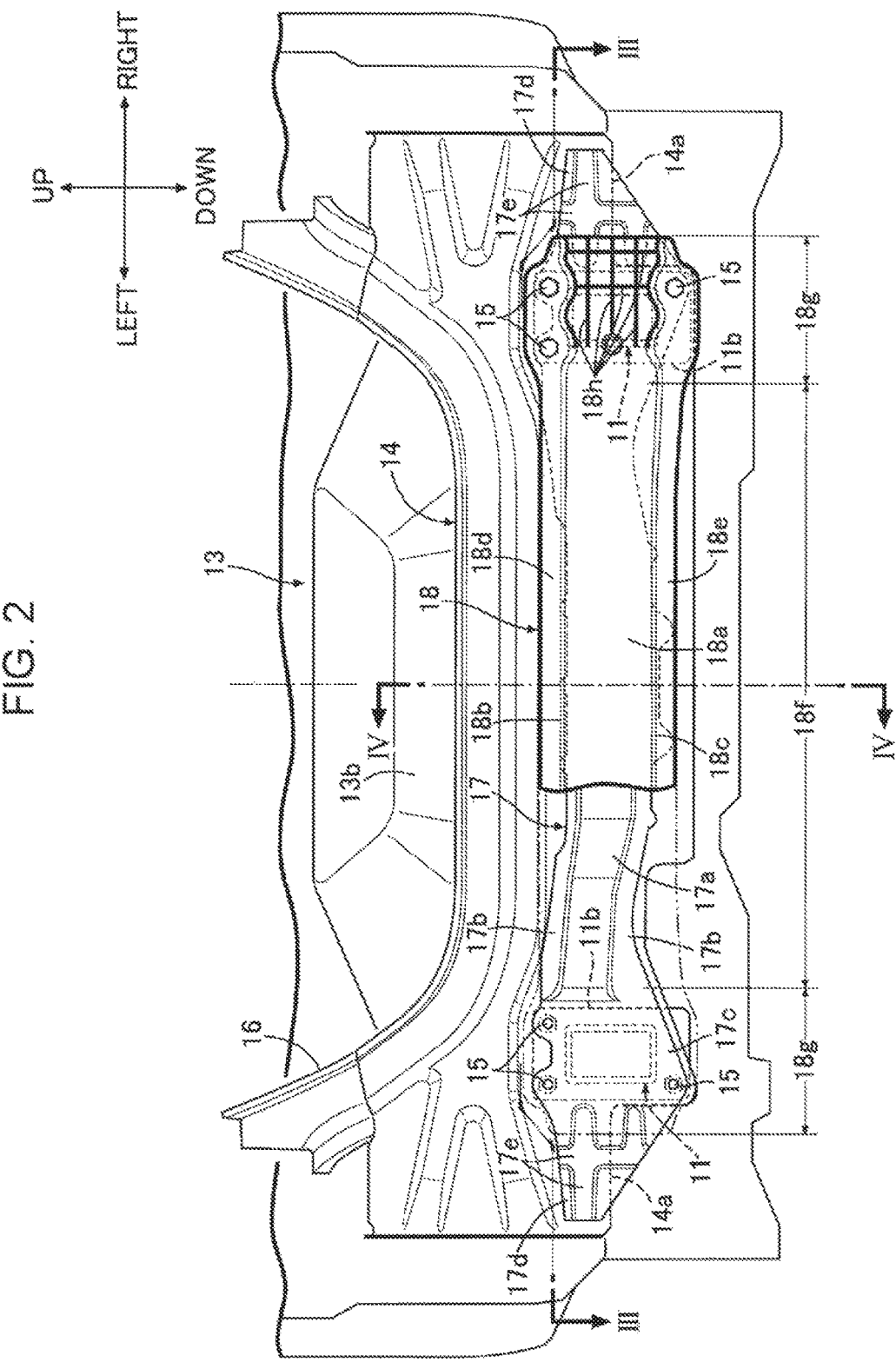
FIG. 2 is a view in the direction of arrow II in FIG. 1.

As illustrated in FIGS. 1A, 1B, and 4, a left-and-right pair of rear side frames 11 extending along a longitudinal direction are arranged on the opposite side portions in a vehicle width direction in an automotive vehicle body rear portion. The left and right rear side frames 11 are linear members having a rectangular closed cross section and include plate-like flanges 11a at their front, ends. The flanges 11a are secured to rear ends of a left-and-right pair of side sills, respectively, by four bolts 12. A rear floor panel 13 covers the top surface of the left and right rear side frames 11 and includes a bottom wall portion 13a positioned in its central portion in the vehicle width direction, a front wall portion 13b rising from a front end of the bottom wall portion 13a, and side wall portions 13c rising from left and right ends of the bottom wall portion 13a. The bottom wall portion 13a constitutes a floor of a trunk in the vehicle body rear portion.

A rear panel 14 extends along the vehicle width direction and vertical direction, constitutes a rear wall of the trunk, and has a lower edge. The lower edge overlaps a rear surface of a flange 13d which is an upwardly bent rear end of the rear floor panel 13 and is welded thereto at w1. The opposite end portions and adjacent areas of the rear panel 14 in the vehicle width direction overlap rear surfaces of plate-like flanges 11b on the rear ends of the left and right rear side frames 11 and are secured thereto, respectively, by four bolts 15. The rear panel 14 has a rearwardly bent upper edge. The front surface of the upper edge overlaps a stiffener 16 opened rearward having a U-shape cross section, is welded thereto at w2 such that they define a closed cross section, and thus they form an upper edge of an open section of the trunk.

A rear cross member 17 and a rear bumper beam 18 are fixed on the rear surface of the rear panel 14. The rear cross member 17 is made of metal and extends along the vehicle width direction. The rear bumper beam 18 is made of a fiber-reinforced resin, extends along the vehicle width direction, and covers the rear cross member 17 from behind.

Next, the structures of the rear panel 14, rear cross member 17, and rear bumper beam 18 are described in further detail with reference to FIGS. 1A to 4.

The rear cross member 17 is a metal plate shaped by press forming and includes a second rear protrusion 17a protruding rearward. Upper and lower flanges 17b vertically extending from upper and lower edges of the second rear protrusion 17a overlap the rear surface of the rear panel 14 and are welded thereto at w3, and thus a closed cross section having space β expanding in the transverse direction is formed between the rear panel 14 and rear cross member 17 (see FIG. 4). The rear cross member 17 includes a left-and-right pair of flat portions 17c continuing from the opposite sides of the second rear protrusion 17a in the vehicle width direction. The left and right flat portions 17c are joined to the rear surface of the rear panel 14 by the shared bolts 15.

The rear cross member 17 includes a left-and-right pair of extending portions 17d extending further outward from the left and right flat portions 17c in the vehicle width direction. The opposite ends of the left and right extending portions 17d in the vehicle width direction reach the opposite ends of the rear panel 14 in the vehicle width direction, respectively. The rear panel 14 and extending portions 17d overlapping each other are connected together by welding. The left and right extending portions 17d are provided with a plurality of reinforcing beads 17e extending along the vertical direction and vehicle width direction and protruding rearward. The rear panel 14 has indentations 14a in lower portions of its opposite ends in the vehicle width direction. The lower half sections of the extending portions 17d in the rear cross member 17 face the indentations 14a in the rear panel 14.

The rear bumper beam 18, which is made of a fiber-reinforced resin, includes a rear wall 18a at the rear end, an upper wall 18b extending forward from the upper end of the rear wall 18a, a lower wall 18c extending forward from the lower end of the rear wall 18a, an upper flange 18d which is an upwardly bent front end of the upper wall 18b, and a lower flange 18e which is a downwardly bent front end of the lower wall 18c. The rear bumper beam 18 has a U-shaped cross section opened forward as a whole.

The rear bumper beam 18 includes a first rear protrusion 18f in its central portion in the vehicle width direction and vehicle-body fixing portions 18g on its opposite ends in the vehicle width direction. The first rear protrusion 18f protrudes rearward in an arch-shaped manner from the vehicle-body fixing portions 18g, for example, in plan view. Space α extending along the longitudinal direction is formed between the second rear protrusion 17a in the rear cross member 17 and the first rear protrusion 18f in the rear bumper beam 18 (see FIG. 4).

The vehicle-body fixing portions 18g in the rear bumper beam 18 are provided with many ribs 18h on their rear surfaces and are secured to the rear surfaces of the flat portions 17c in the rear cross member 17 by the bolts 15. That is, the rear panel 14, flat portions 17c in the rear cross member 17, and vehicle-body fixing portions 18g in a three-layered state are superimposed on the flanges 11b on the rear ends of the rear side frames 11 and are joined thereto by the shared bolts 15.

When the vehicle body rear portion assembled in the above-described way is seen from the rear, the left and right extending portions 17d in the rear cross member 17 protrude outward in the vehicle width direction from the left and right vehicle-body fixing portions 18g in the rear bumper beam 18.

Next, operation in the embodiment of the present disclosure including the above-described configuration are described.

When an automobile according to the present embodiment takes small impact from behind and an impact load is input to the rear bumper beam 18, which is in the rearmost position, the space α expanding along the longitudinal direction is present between the first rear protrusion 18f, which is in the central portion in the vehicle width direction in the rear bumper beam 18, and the second rear protrusion 17a, which is in front of the first rear protrusion 18f and is in the central portion in the vehicle width direction in the rear cross member 17, and the space β expanding along the longitudinal direction is present between the rear cross member 17 and the rear panel 14 which closes the front opened portion of the rear cross member 17. Thus, the spaces α and β ensure a sufficient crush stroke of the rear bumper beam 18 and rear cross member 17, and the effect of absorbing an impact energy can be enhanced.

For electric vehicles that carry batteries in rear trunks or fuel-cell electric vehicles that carry hydrogen tanks in rear trunks, the effect of absorbing an impact energy brought by crushing of the rear trunk may not be expected. According to the present, embodiment, the impact energy can be absorbed by crushing of the rear bumper beam 18 and rear cross member 17.

When a larger impact load is input to the rear bumper beam 18, the impact load is conveyed from the left and right, opposite end portions of the rear bumper beam 18, rear cross member 17, and rear panel 14 to the left and right rear side frames 11. The rear side frames 11 arranged in the longitudinal direction are crushed along the axial direction by that impact load, and the impact energy is absorbed. At that time, because the rear panel 14, rear cross member 17, and rear bumper beam 18 are fixed on the flanges 11b on the rear ends of the rear side frames 11 in a three-layered state, the strength of the three-layered portion is increased by the increased thickness, the impact load is effectively conveyed to the rear ends of the rear side frames 11, the crush of the rear side frames 11 in the axial direction is promoted, and the effect of absorbing the impact energy is enhanced.

The extending portions 17d, which extend outward in the vehicle width direction from the opposite end portions of the rear bumper beam 18 in the vehicle width direction, are disposed on the opposite end portions of the rear cross member 17 in the vehicle width direction, respectively. Because the extending portions 17d overlap the rear surface of the rear panel 14 and are connected thereto, the torsional rigidity of the vehicle body rear portion is effectively increased by the rear cross member 17. In addition, because the indentations 14a are disposed on the opposite end portions of the rear panel 14 in the vehicle width direction and the reinforcing beads 17e are disposed on the extending portions 17d, which are positioned behind the indentations 14a, the weight of the rear panel 14 can be reduced by the weight of the indentations 14a, and the torsional rigidity of the vehicle body can also be ensured by the reinforcing beads 17e on the extending portions 17d.

The embodiment of the present disclosure is described above. Various design changes can be made in the present disclosure without departing from the scope thereof.

For example, the rear bumper beam 18, which is made of a fiber-reinforced resin in the embodiment, may be made of a metal.

The shape of the reinforcing beads 17e in the rear cross member 17 is not limited to that in the present embodiment. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body structure comprising:
   a rear panel extending in a vehicle width direction and disposed at a vehicle body rear portion;
   a rear cross member extending in the vehicle width direction, connected to a rear surface of the rear panel, and defining a closed cross section between the rear cross member and the rear panel; and
   a rear bumper beam extending in the vehicle width direction and connected to a rear section of the rear cross member,
   wherein the rear cross member includes an extending portion extending outward in the vehicle width direction from an outer end of the rear bumper beam in the vehicle width direction along the rear panel,
   wherein the extending portion is overlapped on the rear surface of the rear panel, and is directly joined to the rear surface of the rear panel.

2. The vehicle body structure according to claim 1, wherein the rear panel has an indentation at an outer end thereof in the vehicle width direction,
   the extending portion has a section positioned behind the indentation, the section including a reinforcing bead.

3. The vehicle body structure according to claim 1, wherein the rear bumper beam includes a first rear protrusion disposed at a substantially central portion thereof in the vehicle width direction, the first rear protrusion protruding rearward and defining space between the rear bumper beam and the rear cross member, and
   the rear cross member includes a second rear protrusion disposed at a substantially central portion thereof in the vehicle width direction, the second rear protrusion protruding rearward toward the first rear protrusion.

4. The vehicle body structure according to claim 1, wherein the rear bumper beam has a length shorter than that of the rear cross member such that the extending portion protrudes outward in the vehicle width direction from the outer end of the rear bumper beam.

5. The vehicle body structure according to claim 1, wherein the rear bumper includes an outer end in the vehicle width direction, the outer end of the rear bumper includes a reinforcing rib.

6. The vehicle body structure according to claim 5, wherein the outer end of the rear bumper, the rear cross member and the rear panel are superimposed on a rear end of a rear side frame of a vehicle body.

7. A vehicle comprising the vehicle body structure according to claim 1.

8. The vehicle body structure according to claim 1, wherein the extending portion is joined to the rear surface of the rear panel by welding.

9. A vehicle body structure comprising:
   a rear panel extending in a vehicle width direction and disposed at a vehicle body rear portion;
   a rear cross member extending in the vehicle width direction, connected to a rear surface of the rear panel, and defining a closed cross section between the rear cross member and the rear panel; and
   a rear bumper beam extending in the vehicle width direction and connected to a rear section of the rear cross member,
   wherein the rear cross member includes an extending portion extending outward in the vehicle width direction from an outer end of the rear bumper beam in the vehicle width direction along the rear panel,
   wherein the rear panel has an indentation at an outer end thereof in the vehicle width direction,
   the extending portion has a section positioned behind the indentation, the section including a reinforcing bead.

10. A vehicle body structure comprising:
   a rear panel extending in a vehicle width direction and disposed at a vehicle body rear portion;
   a rear cross member extending in the vehicle width direction, connected to a rear surface of the rear panel, and defining a closed cross section between the rear cross member and the rear panel; and
   a rear bumper beam extending in the vehicle width direction and connected to a rear section of the rear cross member,
   wherein the rear cross member includes an extending portion extending outward in the vehicle width direction from an outer end of the rear bumper beam in the vehicle width direction along the rear panel,
   wherein the rear bumper beam includes a first rear protrusion disposed at a substantially central portion thereof in the vehicle width direction, the first rear protrusion protruding rearward and defining space between the rear bumper beam and the rear cross member, and
   the rear cross member includes a second rear protrusion disposed at a substantially central portion thereof in the vehicle width direction, the second rear protrusion protruding rearward toward the first rear protrusion.

* * * * *